Sept. 10, 1968     M. A. TABET     3,401,270
COMPOSITE COVER FOR A LIGHT CONTROL UNIT
Filed Aug. 25, 1964     3 Sheets-Sheet 1

INVENTOR
MICHAEL A. TABET
BY
ATTORNEY

Sept. 10, 1968  M. A. TABET  3,401,270
COMPOSITE COVER FOR A LIGHT CONTROL UNIT
Filed Aug. 25, 1964  3 Sheets-Sheet 2
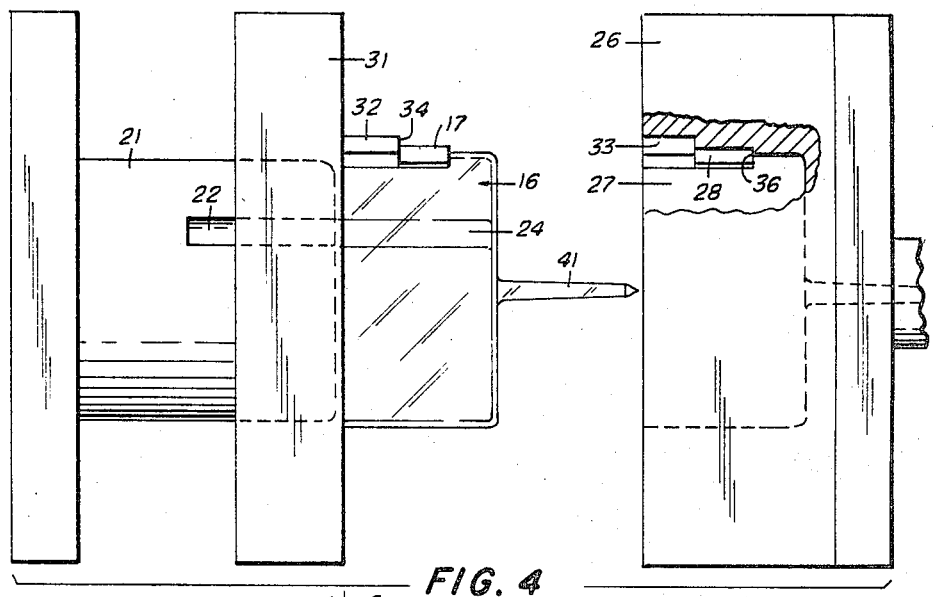
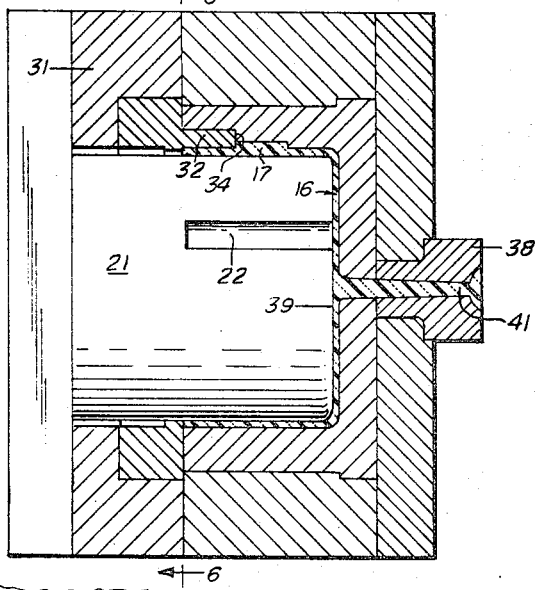
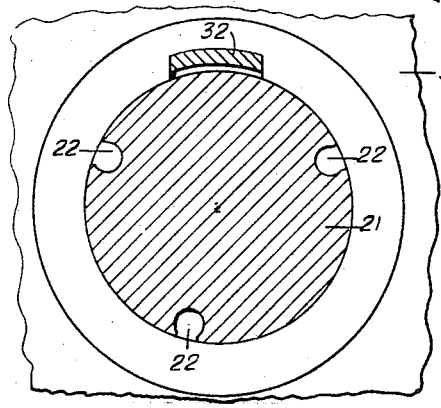
INVENTOR
MICHAEL A. TABET
ATTORNEY

INVENTOR
MICHAEL A. TABET
BY
ATTORNEY

United States Patent Office 3,401,270
Patented Sept. 10, 1968

3,401,270
COMPOSITE COVER FOR A LIGHT
CONTROL UNIT
Michael A. Tabet, 1336 Ballentine Blvd.,
Norfolk, Va. 23512
Filed Aug. 25, 1964, Ser. No. 391,953
3 Claims. (Cl. 250—239)

ABSTRACT OF THE DISCLOSURE

A composite inverted cup-shaped cover of weatherproof construction for an electrical control unit which is activated by a photoelectric element. An outer layer of opaque material encases an inner liner of light transmissive material except for a pane portion through which natural light may pass to actuate the photoelectric element. The pane portion locks the outer layer in place.

The present invention relates to a cover formed of molded plastic materials providing a housing for protecting an electrical control unit which includes a photoelectric element which serves to control the energization and de-energization of a load such as a street lamp and the invention more specifically pertains to a molded cup-shaped cover having an inner liner formed of a transparent composition and an outer layer of opaque material molded about the inner liner with a portion of the transparent material forming a pane through which natural light may pass to activate the photoelectric element.

In my application Ser. No. 373,764 filed June 9, 1964 there is disclosed a cover for a photoelectric control unit wherein a transparent pane is provided in the wall of an opaque cover and the present invention pertains to a composite cover wherein the transparent pane is formed integral with a transparent inner liner for the cover with the opaque plastic composition molded about the inner liner with a wall portion of the transparent material serving to provide the pane through which light may pass for activating the photoelectric element.

An object of the invention is to provide a cover for encasing and protecting an electrical control unit from adverse weather wherein an opening in an opaque portion of the cover is closed by a transparent pane formed integral with a cup-shaped inner liner which extends substantially throughout the interior of the opaque portion of the cover and to thereby avoid the possibility of leakage in the cover at the perimeter of the transparent pane.

Other objects anf features of the invention will be appreciated and become apparent as the present disclosure proceeds and upon consideration of the accompanying drawings taken in connection with the following detailed description wherein an embodiment of the invention is disclosed together with method steps for manufacture of the composite cover.

In the drawings:

FIG. 4 is a side elevational view of the inner liner and illustrating elements of mold apparatus for shaping the inner liner.

FIG. 5 is a sectional view through mold elements and illustrating the manner in which the inner liner is formed.

FIG. 6 is a sectional view taken on the line 6—6 of FIG. 5.

Figure 7:
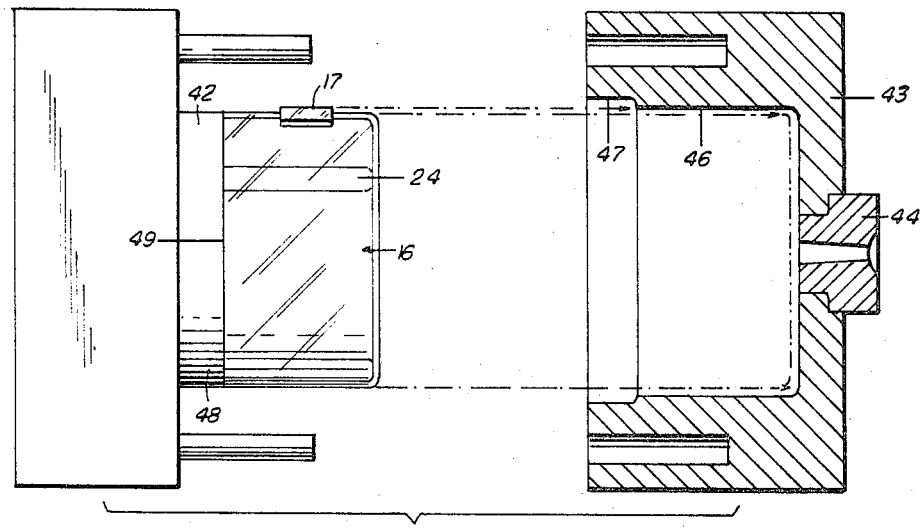

FIG. 7 in the left portion is a side elevational view of a male part of molding apparatus showing the transparent inner liner in position thereon with the structure shown at the right representing a section of a female part of the molding apparatus for forming the outer opaque layer about the inner liner.

Figure 8:
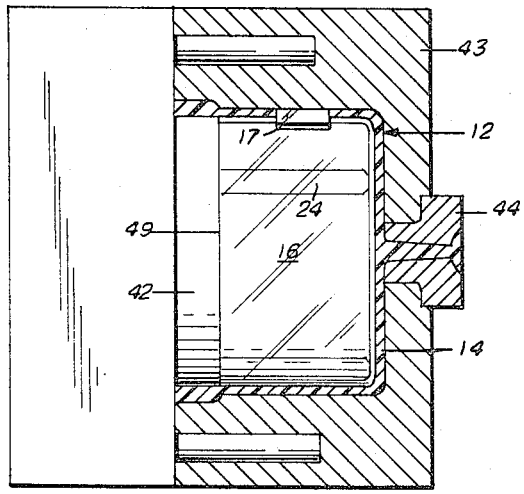

FIG. 8 is a sectional view showing the mold elements of FIG. 7 in the closed position and illustrating the manner in which the opaque material is molded about the inner liner.

Figure 1:
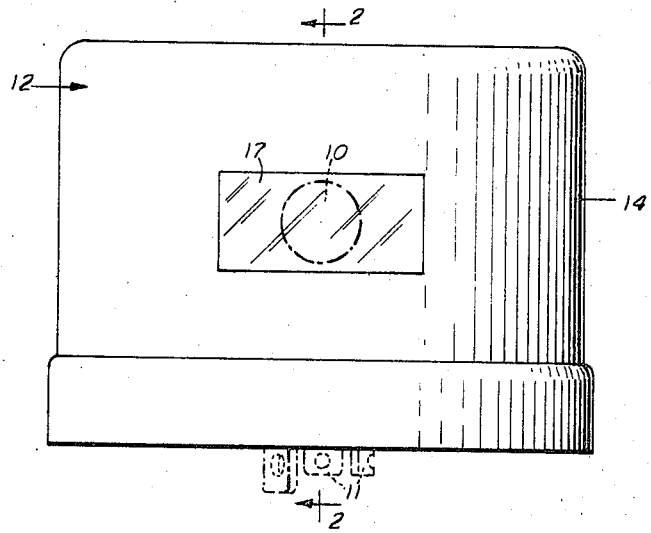
FIG. 1 is an elevational view of a cover embodying the invention.
Figure 2:
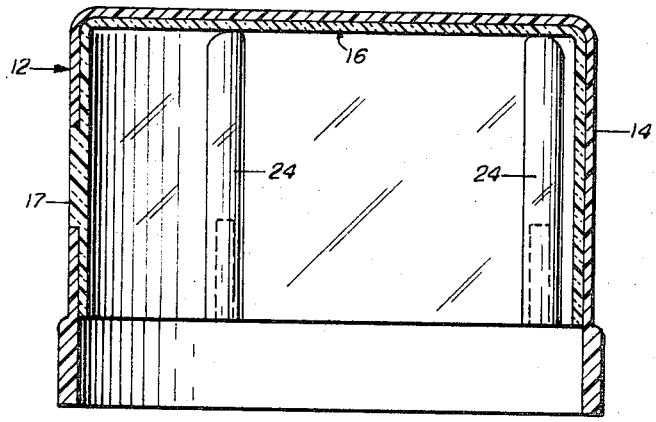
FIG. 2 is a sectional view taken on the line 2—2 of FIG. 1.
Figure 3:
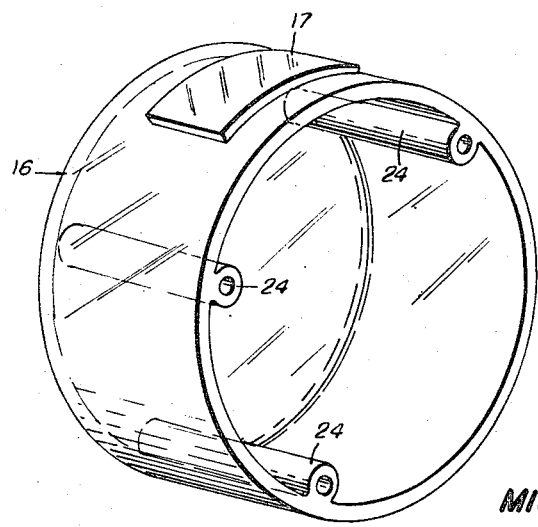
FIG. 3 is a perspective view of the transparent inner liner showing the pane portion formed integral with the inner liner.

Electrical control units which include a photoelectric element for establishing energization and de-energization of a circuit leading to a street lamp in response to the absence and the presence of natural light falling on the photoelectric element are in use. The electrical components and supports therefor are encased within a protective cover whereby the unit may be mounted on the lamp fixture or a street lamp standard. A cover embodying the invention is shown in FIGS. 1 and 2 and the photoelectric element of the control units is represented at 10 in FIG. 1. The cover is of inverted cup-shape and fits over the electrical unit and electrically conductive prongs 11 project below the base of the control unit so that they may be introduced in an electrical socket carried by the lamp fixture or the standard for a street lamp. A cover 12 exhibiting the invention serves as a protective housing shielding the electrical components of the unit from weather conditions and providing a shield for natural light except through a limited portion of the skirt of the cover.

The cover 12 is a composite structure having an outer cup-shaped portion 14 formed of an opaque composition while the inner liner 16 is formed of a transparent composition. A wall portion of the inner liner 16 provides a transparent pane 17 of limited circumferential dimensions and limited axial dimensions and with a thickness substantially equal to the thickness of the outer opaque layer 14 plus the thickness of the wall of the inner liner 16.

In the manufacture of such a composite cover 12 the inner liner 16 is first formed and it may be shaped in molding equipment shown in FIG. 4 through 6 wherein the male member 21 of the molding apparatus has a generally cylindrical exterior with suitable draft characteristics and provided with a plurality of axially extending grooves 22 in the periphery for forming ribs 24 on the interior of the inner liner 16. The mold includes a female part 26 having a cavity 27 therein for shaping the exterior of the inner liner 16 and the pane portion 17 integral therewith. The mold cavity 27 has a recess 28 in the wall of the generally cup-shaped cavity to shape the window pane portion 17. The molding apparatus includes an intermediate member 31 which surrounds the male portion 21 and is movable with respect thereto. The intermediate member 31 is provided with an arcuate projection 32 of limited circumferential length corresponding to the circumferential length of the pane portion 17. The projection 32 is adapted to be accommodated in a recess 33 in the female member 26. An end surface 34 on the projection 32 and a shoulder 36 defining the inner end of the recess 28 serve to shape the lower and upper edges of the pane portion 17 of the inner liner.

When the mold parts are closed as shown in FIG. 5 a transparent plastic composition is introduced under pressure through the opening in the sprue bushing 38 and this plastic material is forced into the generally cup-shaped space provided in the mold apparatus between surfaces of the male member 21 and the female member 26. The thickness of the skirt portion of the inner liner 16 is substantially equal to that of the end wall 39 but the recess 28 and the projection 32 serve to mold the window pane portion 17 with a greater thickness and which is substantially equal to that of a complete composite cover after the opaque composition is molded thereabout in a manner as hereinafter described. The mold parts may be moved to the open position as shown in FIG. 4 so that the transparent inner liner 16 may be removed from the mold apparatus and stripped from the male member 21. The sprue 41 may be removed in any conventional manner to provide a flat surface flush with the outer surface of the end wall 39.

The composite cover may be completed in molding equipment such as illustrated in FIGS. 7 and 8 wherein a male element is shown at 42 and the female member is illustrated at 43. The transparent inner liner 16 with its integral window pane portion 17 is arranged over the male member 42 and when the mold elements are in the closed position shown in FIG. 8 an opaque plastic composition is forced through the sprue bushing 44 under pressure whereby this plastic material flows into space between the exterior surfaces of the inner liner 16 and the interior surfaces of the female mold member 43. The inner generally cylindrical surface 46 of the female mold member 43 fits along the peripheral exterior surface of the window pane portion 17 as shown in FIG. 8 so that the opaque plastic composition does not overlie the exterior surface of the pane portion 17. The opaque plastic composition flows around and into contact with the peripheral edges of the transparent pane portion 17. The female mold member 43 is provided with a cylindrically shaped mouth 47 which cooperates with the exterior surface 48 of the male member 42 to provide a thickened wall portion of opaque material at the free end of the skirt of the composite cover and beyond the free end 49 of the transparent inner liner 16. The draft characteristics of the male member 42 and the female member 43 permit the mold parts to be moved to the open position and allow the composite cover 12 to be removed from the molding equipment.

The method of manufacturing the composite cover 12 results in a housing for encasing the electrical elements of a control unit which is opaque throughout a major portion of the cup-shaped cover. The light transmitting pane 17 formed of a plastic composition and integral with the inner liner prevents entry of moisture or foreign matter through the opening in the opaque outer layer 14. The pane 17 allows a limited amount of the natural light to pass therethrough and into the presence of the photoelectric element 10. The cover and the pane provide an impervious housing shielding the electrical components and other structural elements from the weather.

In carrying out the invention various types of thermoplastic molding compositions may be employed. In one embodiment an opaque "Tenite Butyrate" is employed in forming the outer layer 14. The inner liner 16 and its light transmitting pane 17 may be formed of a thermoplastic molding composition such as "Tenite Butyrate" which is clear and transparent. Such molding compositions are marketed by Eastman Chemical Products, Inc. Other thermoplastic molding compositions may be employed such as acrylic resins manufactured and marketed by E. I. du Pont de Nemours & Company, Inc., under the trademark "Lucite." Such acrylic resin plastic compositions have opaque characteristics for the outer layer 14 and clear or translucent light transmitting characteristics for the inner liner 16 and the pane portion 17.

While the invention has been described with regard to one type of cover it will be appreciated that the structure of the housing may be varied and the shape of the pane portion may be altered. Such changes and other modifications may be made in the cover along with the steps of carrying out the method of making the composite housing without departing from the spirit and scope of the invention as set forth in the appended claims.

What I claim and desire to secure by Letters Patent is:

1. A composite weatherproof cover and shield for an electrical control unit which includes a photoelectric element comprising, an inverted cup-shaped inner liner formed of light transmissive material having a top wall and a depending skirt wall, a pane portion integral with said skirt wall and of greater thickness than said skirt wall, an inverted cup-shaped outer layer of opaque material overlying said top wall and snugly encasing said skirt wall except for said pane portion, and a lower edge of said pane portion forming an abutment for said outer layer preventing separation of the outer layer from the inner liner.

2. A composite weatherproof cover and shield for an electrical control unit which includes a photoelectric element according to claim 1 wherein the exterior surface of said pane portion is substantially flush with the exterior surface of said outer layer.

3. A composite weatherproof cover and shield for an electrical control unit which includes a photoelectric element according to claim 1 wherein side edges of the pane portion form abutments for said outer layer preventing rotation of the inner liner relative to the outer layer.

References Cited

UNITED STATES PATENTS

| | | | |
|---|---|---|---|
| 2,756,349 | 7/1956 | Frank | 250—239 X |
| 3,086,250 | 4/1963 | Gits | 264—274 X |

RALPH G. NILSON, *Primary Examiner.*

M. A. LEAVITT, *Assistant Examiner.*